United States Patent Office

3,210,257
Patented Oct. 5, 1965

3,210,257
PURIFICATION OF PAPAIN FROM FRESH PLANT EXTRACTS
Theodore Cayle, New York, N.Y., assignor to Baxter Laboratories, Inc., Morton Grove, Ill., a corporation of Delaware
No Drawing. Filed Jan. 9, 1963, Ser. No. 250,213
5 Claims. (Cl. 195—66)

The present invention relates to a method for the purification of enzymes. More particularly, it relates to the purification of papain from the whole fresh plant extracts or the juice of the papaya plant.

Generally the papain of commerce is derived from the latex of the fruit of the adult tropical plant, *Carica papaya* L. Until recently no attempts had been made to isolate papain from any other part of the plant. Recently it has been discovered that the fluid extracts prepared from the plant itself contain a significant amount of papain. The whole fresh plant extracts also contain a large number of high molecular weight components in addition to the proteolytic complex referred to as papain. These contaminants consist of other proteins, plant gums, pigments and the like. In the past, it has been extremely difficult to isolate the papain complex from the contaminants in a manner which would result in a papain complex of high purity and activity.

It is an object of the present invention to describe a method for the isolation and the purification of papain from whole fresh plant extracts or juices.

It is a further object of the present invention to disclose a novel method of treating the fluid plant extracts, or juices, in a manner which will result in a superior papain compound.

These and still other objects will become apparent from the specification as it proceeds.

It has now been discovered that a highly purified papain complex may be obtained from the fresh plant extract or juice of the papaya by a method which comprises adjusting the pH of the extracts to an acidic pH, filtering and concentrating the resulting mixture, adding salt with mixing to the mixture to form a copious precipitate consisting of both active and inactive protein matter, separating the inactive precipitate from the active protein matter and treating the active fraction to obtain a highly purified papain complex.

In the preferred practice of the present invention the juice derived from pressing the papaya plant is treated with sodium bisulfite to a final concentration of 0.2%. The pH is then adjusted to about 4 with HCl and the mixture heated for 20 minutes at 55° C. Approximately 5% of a filter aid, such as diatomaceous earth, as based on the weight of the starting juice, is added to the mixture and followed by filtration. The filtrate is concentrated to about 8 Bé. and transferred to a holding vessel which allows for observation of the contents from the side, and which is provided for withdrawal of the contents through a bottom valve. Suitable salt such as ammonium sulfate is then added to the mixture in an amount equal to about 30% by weight. The resulting mixture is stirred and allowed to settle. The active protein matter rises to the top of the vessel and a copious precipitate of inactive material settles to the bottom of the vessel. When a clearly definite break appears between the active and inactive material the lower, inactive precipitate is removed through the bottom of the vessel and discarded. The remaining material is then treated with additional filter aid (about 4%) filtered and washed with a 30% solution of ammonium sulfate. The filter cake is then extracted with water and the enzyme further purified by methanol precipitation. The product obtained is a highly purified papain with an activity as high as 1200 P.A. units.

The activity of the papain is preferably expressed in terms of P.A. units which are obtained by the Casein Digestion Assay which is hereinafter described.

CASEIN DIGESTION ASSAY

This method has been devised for the assay of the total proteolytic activity of papain and other proteases. It is based on the digestion of casein under conditions which permit maximum enzyme activation and thus, the maximum potential proteolysis.

The digestion mixture used in this assay contains 0.7% casein, buffered at a pH of 6.0. The presence of 0.01 M cysteine and of 0.01 disodium ethylenediaminetetraacetate dihydrate offers assurances of maximum activation and the elimination of trace metal impurities which might possibly inhibit the enzyme system. The proteolytic digestion is carried out for a period of one hour at 40° C. and the undigested casein is precipitated with trichloroacetic acid. The amount of trichloroacetic acid soluble nitrogen in the filtrate is then determined by means of a Kjeldahl procedure, or by means of adsorbance measurements at 280 mu. The Kjeldahl procedure is the method employed here.

*Solutions*

(a) *Phosphate buffer.*—To make a 0.05 M solution, dissolve 7.1 grams of anhydrous disodium phosphate in water and dilute to 1,000 ml. with water. Add a drop of toluene as a preservative.

(b) *Citric acid.*—To make a 0.05 M solution, dissolve 10.5 grams of citric acid monohydrate in 1,000 ml. of water. Add a drop of toluene as a preservative.

(c) *Phosphate reagent.*—To 6.3 grams of anhydrous disodium phosphate and 14.0 grams of disodium ethylenediaminetetraacetate dihydrate dissolved in 1,000 ml. of water, add sufficient five normal sodium hydroxide to adjust the pH to 6.9. Usually, this will require approximately 4 ml. of sodium hydroxide solution.

(d) 0.05 N hydrochloric acid.

(e) *Trichloroacetic acid solution.*—Dissolve 22.0 grams of trichloroacetic acid C.P., in 100 ml. of water.

(f) *Casein solution.*—Weight 1.0 gram casein into a beaker and work into a paste, using 10.0 ml. of the phosphate buffer (a). Transfer this paste, using 40.0 ml of phosphate buffer (a) into a 100 ml. volumetric flask. The flask and its contents are then placed in a boiling water bath for 35 minutes, allowed to cool at room temperature for 10–20 minutes and finally cooled with tap water to a temperature of 25–27° C. To this solution is added slowly, while agitating, 13.4 ml. of citric acid (b). Water is then added to bring the volume of liquid to the mark on the flask. The pH of this solution is 6.0.

(g) *Cysteine buffer.*—For each 100 ml. of cysteine buffer required, dissolve 0.6100 gram of cysteine hydrochloride monohydrate in 100 ml. of phosphate reagent (c). The pH of the solution is 6.0.

(h) *Enzyme solution.*—Dissolve approximately 20 P.A. units of the product under investigation in 100 ml. of the cysteine buffer (g). For the purpose of calculations, the enzyme standard provided contains 300 P.A. units of protease activity. Because each gram of the enzyme product used in the formulation contains 300 P.A. units, the quantity of formulated product required for assay can be calculated.

*Assay procedure*

Pipette 25.0 ml. of the substrate solution (f) into a glass-stoppered flask (a 100 ml. volumetric flask is convenient to use for this purpose) and add 10 ml. of enzyme solution (h). It is not necessary to use 10 ml.

of the enzyme solution if it is more convenient to use a smaller aliquot containing the desired level of enzyme. If less than 10 ml. of enzyme solution is added, the difference between the quantity added and 10 ml. should be compensated for by the addition of cysteine buffer (g). The contents of the flask are then well mixed and placed into a thermostatically controlled bath set at 40° C. After 60 minutes, add, while swirling, 20 ml. of the trichloroacetic acid solution (e). Stopper the flask and shake vigorously to break up the coagulated protein. Return the flask and its contents to the 40° C. water bath for an additional 30–40 minutes. The solution is then filtered through filter paper. Twenty-five milliliters of the clear filtrate are used for a Kjeldahl nitrogen determination. The titration of free amino groups is made with 0.05 N hydrochloric acid.

Blank determinations should be run because the cysteine buffer and the enzyme solution, and a small soluble fraction of the casein, contribute to the nitrogen content of the trichloroacetic acid treated filtrates. This blank determination should be run as follows:

To 25 ml. of substrate solution (f) in a glass-stoppered flask, add 20.0 ml. of trichloroacetic acid reagent (e) and the same quantity of enzyme solution (h) used in the determination above, and additional cysteine buffer (g) as required. This reaction mixture is shaken vigorously, placed in a 40° C. bath and held for 30–40 minutes and filtered. The filtrate is assayed for nitrogen as described above. The value of this blank should be constant for a given batch of casein as long as 2.0 mg. or less of the enzyme preparation has been used.

Calculation

One P.A. unit of protease activity is defined as that quantity of enzyme which will digest 1.25 gm. of casein to the extent of 55% during one hour at 40° C. and under the other conditions of the test. At this level of digestion, a 25.0 ml. aliquot of the trichloroacetic acid filtrate will contain the equivalent of 113.5 mg. of casein which will yield, after determination by the Kjeldahl procedure, a titration value of 12.5 ml. of 0.05 N hydrochloric acid. This value corresponds to 8.75 mg. of nitrogen.

The present invention will be further illustrated by reference to the following example in which "all parts and percentages" are "parts and percentages by weight" unless specified otherwise.

EXAMPLE

Fresh press juice, obtained by pressing papaya plants through a sugar cane press, and having a solids content of approximately 6%, and an activity of approximately 1.5 P.A. and a pH of 5.6 is employed. $NaHSO_3$ is added to the juice to obtain a final concentration of 0.2%. The pH is adjusted to 4.0–4.3 with HCl and the mixture heated to 55° C. and maintained at that temperature for 20 minutes. Diatomaceous earth, is added to a final concentration of 5%, based on weight of starting juice and the resultant mixture is filtered and sparged with water.

The mixture is then concentrated to approximately 8 Bé.

The concentrate is transferred to a holding vessel which allows for observation of the contents from the side, and which is provided for withdrawal of the contents through a bottom valve. The pH is maintained at 4.0–4.3. $(NH_4)_2SO_4$ is added to a final concentration of 29% and the mixture mixed thoroughly. Then the mixture is allowed to settle. The active protein rises to the top and copious precipitate settles to the bottom. When the break appears complete the undesirable solids are withdrawn from the bottom and discarded. Filter aid is added to the remaining material in the tank to a final concentration of 4%, based on the weight of the 8 Bé. starting liquor and the mixture filtered and sparged with 30% $(NH_4)_2SO_4$.

The filter cake is suspended in a quantity of water not exceeding approximately one-fourth the weight of the 8 Bé. starting liquor and once again filtered and sparged with a quantity of water so that the combined filtrate and sparge does not exceed one-half the weight of the 8 Bé. starting liquor.

The redissolved liquor is then cooled to 0–5° C. Cooled methanol (0–5°) is added to a final concentration of 60% w./w. Temperature during addition should not exceed 10° C., and should not fall below 5° C. The mixture is then centrifuged. The precipitate is suspended in pre-cooled 99% petrohol (0–4° C.). (May be a sparge, depending on type of centrifuge employed.) The precipitate collected and dried in vacuo. A papain with an activity of 1200 P.A. units, with a yield of approximately 80% is obtained.

Without the practice of the present invention many of the other molecular components or contaminants are carried along with the enzyme product resulting in a final product which is much too low in proteolytic activity to be useful as an item of commerce. On the other hand, the presently described method selectively separates the active fraction of the whole plant extracts from the inactive components, thereby resulting in a highly active papain, up to 1200 P.A. units, in yields up to 80% as based on weight of the starting plant extract. The papain obtained by the exercise of the present invention is qualitatively equivalent to the papain obtained by the past methods using the commercially available dried latex as the enzyme source.

It will be readily understood that considerable variation may be made in the conditions of the method. For example, while $(NH_4)_2SO_4$ appears to be best suited for precipitating the enzyme, $(Na)_2SO_4$ may also be used. Furthermore, other solvents known by practitioners of the art, such as ethanol, isopropanol or acetone, may be used in place of methanol in the final precipitation of the active enzyme.

However, several factors should be controlled in order to insure highest possible yields, i.e. good enzyme recovery appears to be associated with rather low pHs during the processing. Furthermore, it is recommended that the copious precipitate of inactive material be separated as described in the present invention if it is desired to obtain papain of the highest purity and activity.

What I claim is:

1. The method of obtaining a highly active papain fraction which comprises preparing a fluid extract by pressing the juice from the non-fruit portions of the papaya plant, adjusting the solids content of said extract to about 6% by weight, adding sufficient sodium bisulfite to adjust the concentration of the mixture to 0.2% sodium bisulfite by weight, adjusting the pH of the mixture to about 4 and heating it for the equivalent of twenty minutes at 55° C., adding a filter aid and then filtering the mixture, adjusting the filtrate to a concentration of about 8 Bé. and while maintaining the pH at about 4 in a holding vessel adding sufficient salt selected from ammonium sulfate and sodium sulfate to precipitate the active and inactive material in the form of two readily distinct components, one of which floats and the other which settles to the bottom of the container, collecting the floating precipitate which constitutes a highly active papain fraction and discarding the settled precipitate which contains inactive material.

2. The method of claim 1 in which the salt added is ammonium sulfate in an amount equal to about 30% by weight of the concentrated filtrate.

3. In the method of obtaining a highly active papain fraction from a fluid extract prepared from the juice pressed from the non-fruit portions of the papaya plant and the isolation of a papain fraction from that extract by means of salt precipitation, the improvement which comprises adjusting the concentration of a filtrate prepared from the fluid extract to about 8 Bé., maintaining the pH of the concentrate filtrate at about 4 and adding to the concentrated filtrate in a holding vessel a sufficient quantity of salt selected from ammonium sulfate and sodium sulfate to precipitate the active and inactive material in the form of two readily distinct components, one which floats and the other which settles to the bottom of the container, then collecting the floating precipitate which constitutes a highly active papain fraction.

4. The method of claim 3 in which the amount of salt added is equivalent to about 30% by weight of the concentrated filtrate.

5. The method of claim 3 in which the salt added is ammonium sulfate in an amount equal to about 30% by weight of the concentrated filtrate.

References Cited by the Examiner

UNITED STATES PATENTS

| 3,002,891 | 10/61 | Heinicke | 195—66 |
| 3,141,832 | 7/64 | Burdick | 195—66 |

OTHER REFERENCES

Burdick: Article in Chesmurgic Digest, vol. 16, No. 7, pages 4 to 6 and 12 (July 1957).

A. LOUIS MONACELL, *Primary Examiner.*

NORMAN G. TORCHIN, *Examiner.*